(12) United States Patent (10) Patent No.: US 7,750,279 B2
Tagata et al. (45) Date of Patent: Jul. 6, 2010

(54) IMAGE PICKUP APPARATUS AND IMAGE PICKUP UNIT

(75) Inventors: Hiromi Tagata, Nagano (JP); Hiroshi Takasugi, Shiojiri (JP); Takayuki Chiba, Nagano (JP)

(73) Assignee: Olympus Imaging Corp., Tokyo (JP)

( * ) Notice: Subject to any disclaimer, the term of this patent is extended or adjusted under 35 U.S.C. 154(b) by 498 days.

(21) Appl. No.: 11/709,116

(22) Filed: Feb. 20, 2007

(65) Prior Publication Data

US 2007/0195187 A1 Aug. 23, 2007

(30) Foreign Application Priority Data

Feb. 23, 2006 (JP) ............................. 2006-047366
Feb. 23, 2006 (JP) ............................. 2006-047368

(51) Int. Cl.
 *H01L 27/00* (2006.01)
(52) U.S. Cl. ..................... 250/208.1; 250/239; 257/433; 257/783
(58) Field of Classification Search ............... 250/208.1, 250/239; 257/432–433, 704, 773, 778, 783, 257/787; 348/340, 374
See application file for complete search history.

(56) References Cited

U.S. PATENT DOCUMENTS 5,021,888 A * 6/1991 Kondou et al. ................. 348/76

7,166,908 B2 * 1/2007 Minamio et al. ............ 257/680
2001/0050721 A1 12/2001 Miyake

FOREIGN PATENT DOCUMENTS

| CN | 1330487 | 1/2002 |
|---|---|---|
| JP | 2002-218293 | 8/2002 |
| WO | WO 2006/011200 | 2/2006 |

OTHER PUBLICATIONS

Chinese Office Action for Chinese Patent Application Publication No. 2007100070875, mailed Aug. 8, 2008 (4 pgs.) with translation (2 pgs.).
Second Office Action for Chinese Patent Application No. 2007100070875, mailed Jan. 15, 2010 (3 pgs.).

* cited by examiner

*Primary Examiner*—Kevin Pyo
(74) *Attorney, Agent, or Firm*—Straub & Pokotylo; John C. Pokotylo

(57) ABSTRACT

The image pickup apparatus includes: an image pickup device including a pixel region and an electrode; an electric board including the image pickup device arranged to cover an opening and a connection pattern arranged in the vicinity of an edge portion of the opening, in which a first adhesive is applied between the image pickup device and the electric board from the outer edge of the image pickup device at least to an electric connection portion between the connection pattern and the electrode and applied annularly with a first band along an outer edge of the image pickup device; and a protective cover fixed by a second adhesive so as to cover the opening on the other surface of the electric board, wherein the second adhesive is applied annularly with a second band so that the first band width overlaps within the second one.

4 Claims, 8 Drawing Sheets

IMAGE PICKUP APPARATUS AND IMAGE PICKUP UNIT

CROSS REFERENCES TO RELATED APPLICATIONS

This application claims benefit of Japanese Applications No. 2006-047368 filed in Japan on Feb. 23, 2006, and No. 2006-047366 filed in Japan on Feb. 23, 2006, the contents of which are incorporated herein by reference.

BACKGROUND OF THE INVENTION

1. Field of the Invention

The present invention relates to an image pickup apparatus and an image pickup unit, and more particularly to an image pickup unit formed by fixing an image pickup device made of a bare chip and a protective glass to an electric board by an adhesive and an image pickup apparatus to which this form of the image pickup unit is applied.

2. Description of the Related Art

There has been put into practice and widely used an electronic equipment such as a digital camera constructed so that a subject image formed on the basis of a bundle of rays from a subject incident to a photographing optical system is formed on a light receiving surface of an image pickup device made of a bare chip arranged at a predetermined position (charge coupled device (CCD), for example) so as to record the subject image as image data or the like in a predetermined form.

Figure 2:
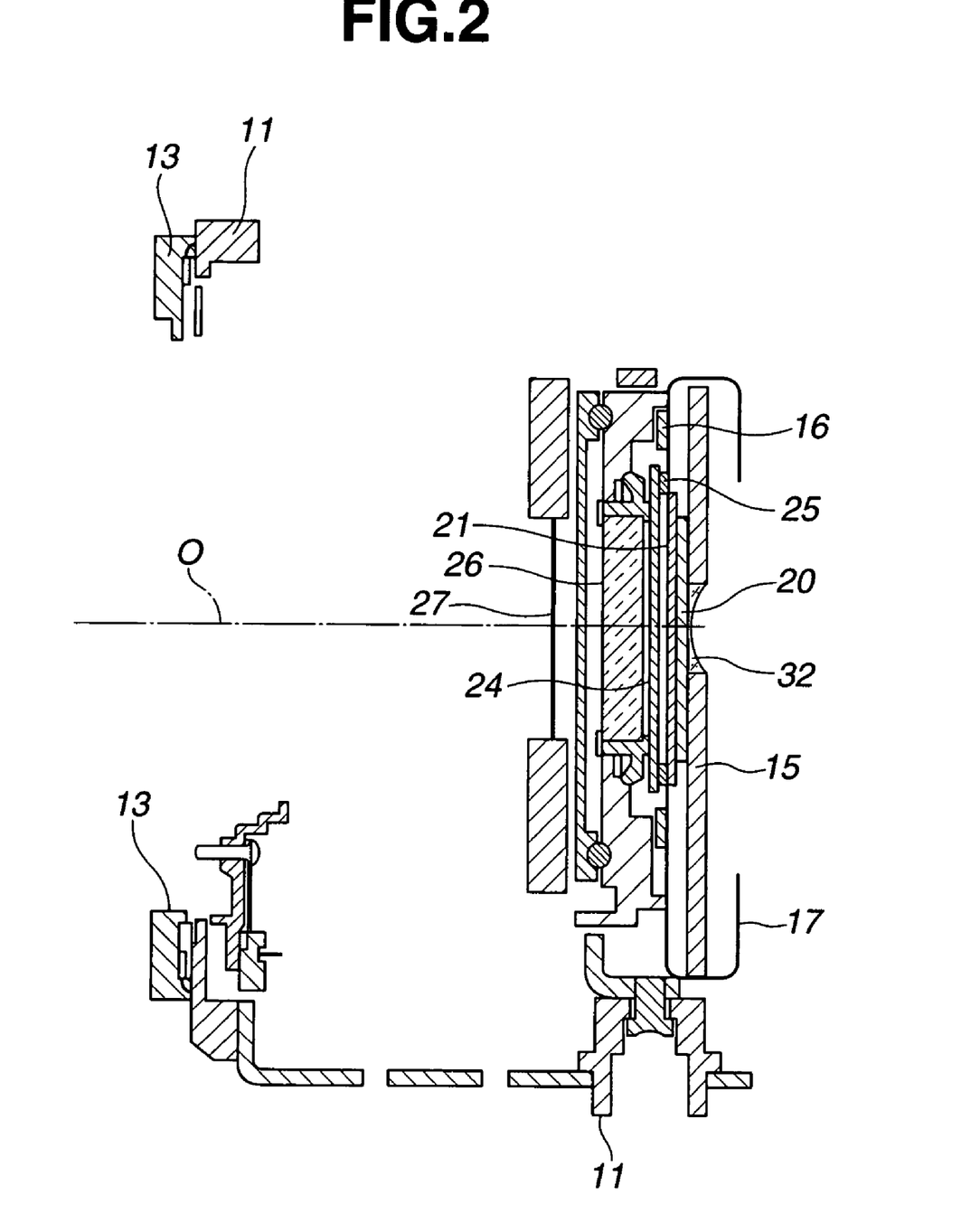
FIG. 2 is a sectional view along [II]-[II] line of FIG. 1.

One example of a form of the image pickup unit incorporated in the image pickup apparatus such as a digital camera is a bare chip-implemented structure as disclosed in Japanese Unexamined Patent Application Publication No. 2002-218293 (See FIG. 2 thereof).

That is, a flexible print circuit board (FPC) is bonded to a protective glass using an adhesive. In this flexible print circuit board, an image pickup device made of a bare chip is connected on a surface opposite to the adhesive surface to which the protective glass is bonded through an electrode pad and a bump. In this case, the light receiving surface of the image pickup device is arranged opposite to the protective glass.

And an adhesive is applied so as to cover this electrode pad and the bump. By this, the flexible print circuit board and the image pickup device are bonded by the adhesive, and a sealing structure of the light receiving surface (pixel region) of the image pickup device is formed.

As mentioned above, an image pickup unit in a conventional generally-used image pickup apparatus has a bare chip-implemented structure in which a bare chip (image pickup device) made of a rigid plate member is bonded to a flexible print circuit board, which is a flexible plate member, by an adhesive, for example.

Also, in an image pickup device made of a normal bare chip, the pixel region is usually designed so that it becomes as large as possible for the chip shape. Therefore, there is a tendency that an interval between an electrode on the same surface as that on which the pixel region of the bare chip (image pickup device) is formed at a portion adjacent to the pixel region and a periphery portion of the pixel region becomes short.

SUMMARY OF THE INVENTION

An image pickup apparatus according to the present invention is an image pickup apparatus in which an image pickup device is implemented on an electric board and comprises an image pickup device made of a bare chip including a pixel region and an electrode provided on a same surface as the pixel region at a portion adjacent to the pixel region, an electric board including an opening and a connection pattern arranged in the vicinity of an edge portion of the opening for connecting to the electrode, in which a first adhesive for fixing the electric board and the image pickup device together is applied between the image pickup device and the electric board from an outer edge of the image pickup device at least to an electric connection portion between the connection pattern and the electrode and applied annularly with a first band width along a peripheral edge of the image pickup device, and a protective cover made of a transparent member and fixed on a surface of the electric board opposite to the surface on which the image pickup device is fixed, around the opening annularly with a second band width by a second adhesive so as to cover the opening in order to protect an image pickup region of the image pickup device, wherein the second adhesive is applied around the opening so that the first band width overlaps within the second band width when seen from the direction orthogonal to the opening plane.

Also, the image pickup apparatus according to the present invention is an image pickup apparatus in which an image pickup device is implemented on an electric board, and comprises an image pickup device made of a bare chip including a pixel region and an electrode provided on a same surface as the pixel region at a portion adjacent to the pixel region, and an electric board including an opening, the image pickup device arranged so as to cover the opening, and a connection pattern arranged in the vicinity of an edge portion of the opening for connecting to the electrode, wherein an opening inner edge of the opening is formed at a position separated by 0.3 mm or more from the electrode toward the pixel region.

Moreover, the image pickup apparatus according to the present invention comprises an image pickup device made of a bare chip including a pixel region and an electrode provided on a same surface as the pixel region at a portion adjacent to the pixel region, and an electric board including an opening, the image pickup device arranged so as to cover the opening, and a connection pattern arranged in the vicinity of an edge portion of the opening for connecting to the electrode, wherein an adhesive for fixing the electric board and the image pickup device is applied in a band state along a peripheral edge of the image pickup device so as to cover at least an electric connection portion between the connection pattern and the electrode from an outer edge of the image pickup device, and an opening inner edge of the opening is formed at a position separated by 0.3 mm or more from an end portion of the electrode toward the pixel region.

Furthermore, the image pickup apparatus according to the present invention comprises an electric board including an opening and a plurality of connection patterns around the opening, and an image pickup device made of a bare chip including a pixel region and electrodes provided on a same surface as the pixel region to be electrically connected to the connection patterns along an outer circumference of the pixel region with an interval of 0.3 mm or more from the pixel region and implemented on the electric board so as to cover the opening of the electric board.

An image pickup unit according to the present invention comprises an image pickup device made of a bare chip including a pixel region and an electrode provided on a same surface as the pixel region at a portion adjacent to the pixel region, an electric board having an opening and a connection pattern arranged in the vicinity of an edge portion of the opening for connecting to the electrode, in which a first adhesive for fixing the electric board and the image pickup device together is applied between the image pickup device and the electric board from an outer edge of the image pickup device at least to an electric connection portion between the connection pattern and the electrode and applied annularly with a first band width along a peripheral edge of the image pickup device, and a protective cover fixed on a surface of the electric board opposite to the surface on which the image pickup device is fixed, around the opening annularly with a second band width by a second adhesive so as to cover the opening in order to protect an image pickup region of the image pickup device, wherein the second adhesive is applied around the opening so that the first band width overlaps within the second band width when seen from the direction orthogonal to the opening plane.

The advantages of the present invention will be further appreciated from the detailed description provided below.

DESCRIPTION OF THE PREFERRED EMBODIMENTS

The present invention will be described below according to illustrated embodiments.

Figure 1:
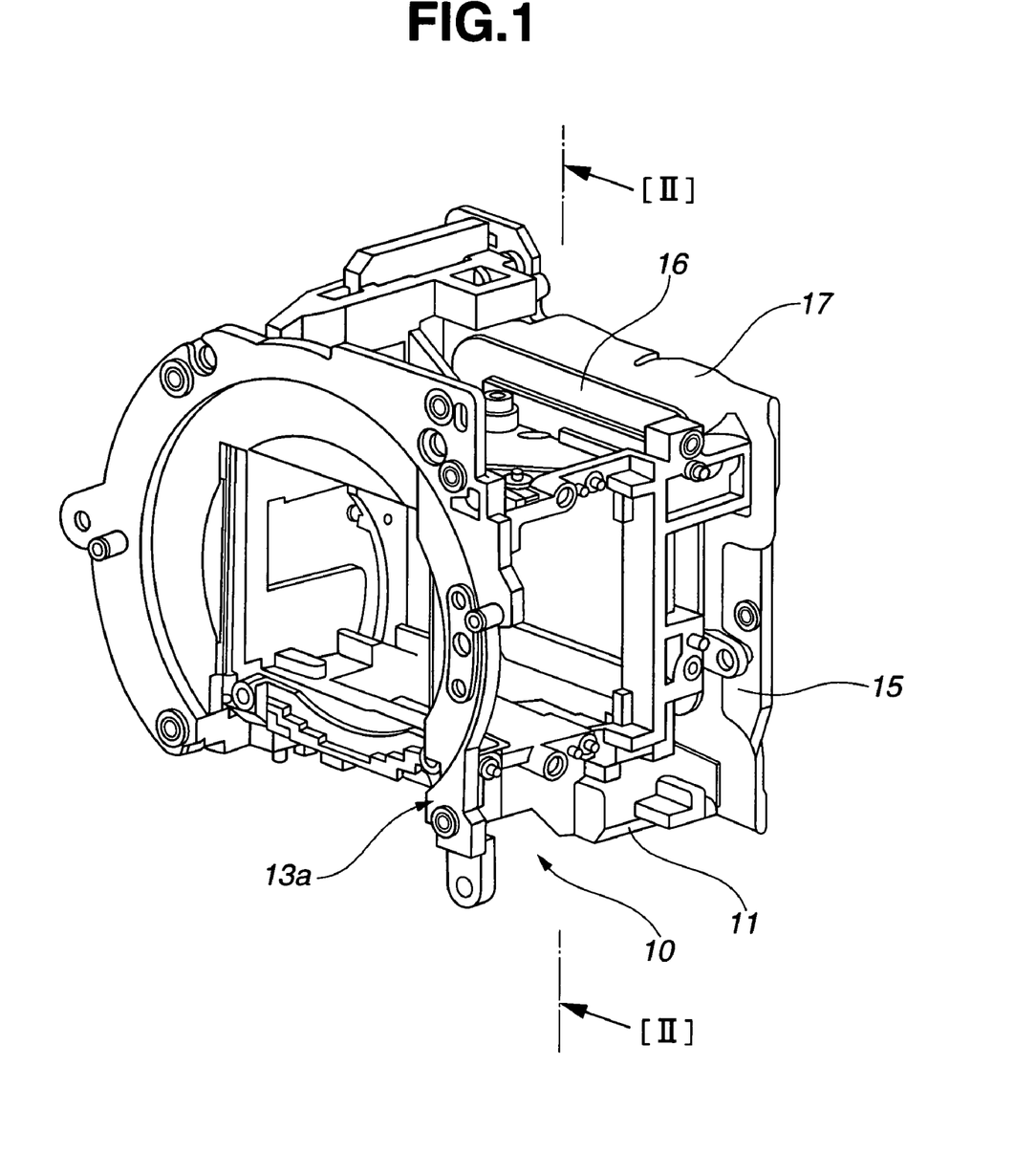
FIG. 1 is perspective view showing a part of an image pickup apparatus according to a first embodiment of the present invention.
Figure 3:
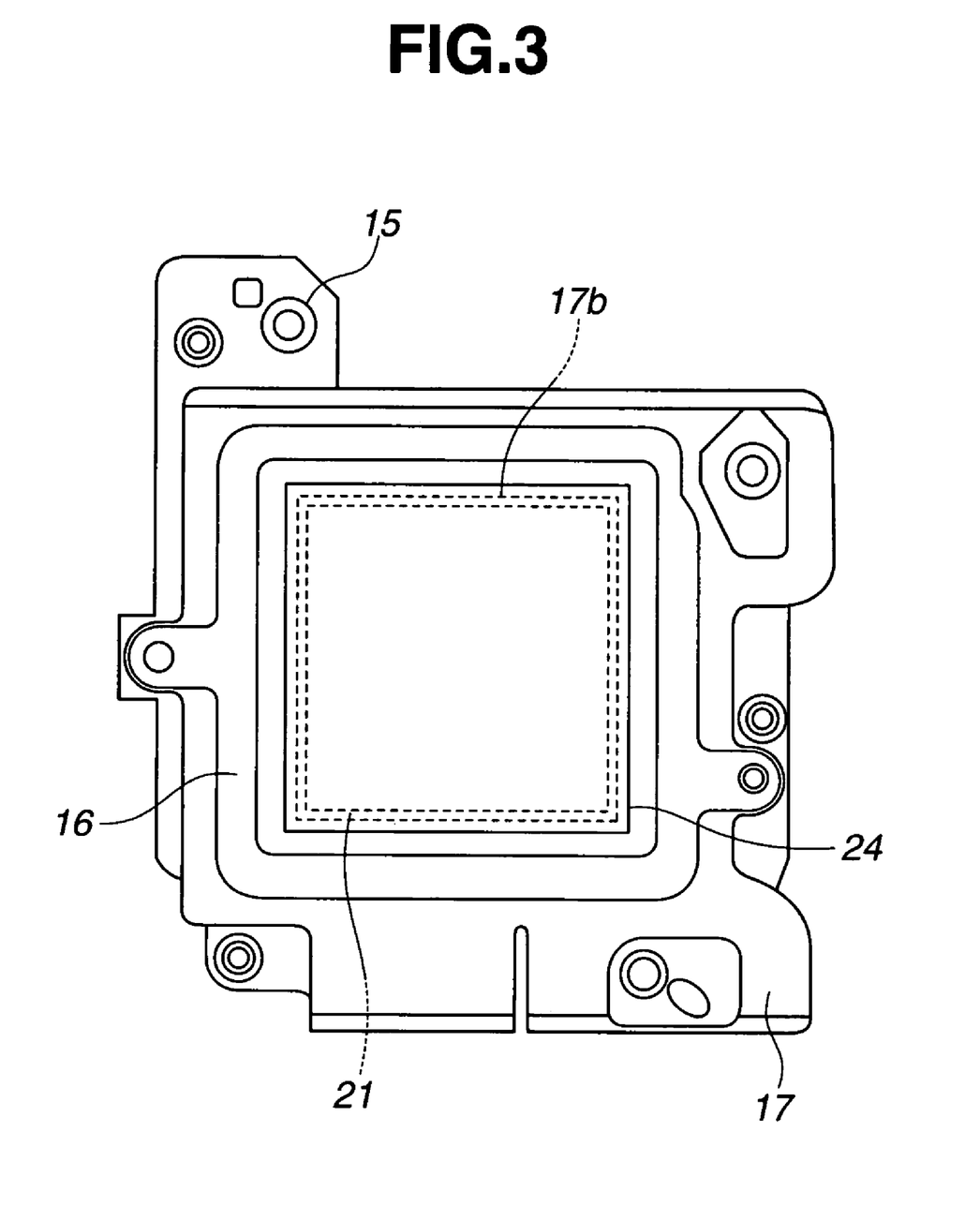
FIG. 3 is a front view showing a configuration of an image pickup unit of the embodiment.

FIGS. 1 and 2 are views showing a mirror box part taken out of a digital single-lens reflex camera (hereinafter referred to merely as digital camera) as an image pickup apparatus to which an image pickup unit of a first embodiment of the present invention is applied. FIG. 1 is a perspective view of the mirror box part excluding a body mount and other mechanism portions which are unnecessary for the description. FIG. 2 is a sectional view along a [II]-[II] line of FIG. 1. FIG. 3 is a front view showing a configuration of the image pickup unit of the present embodiment.

Figure 4:
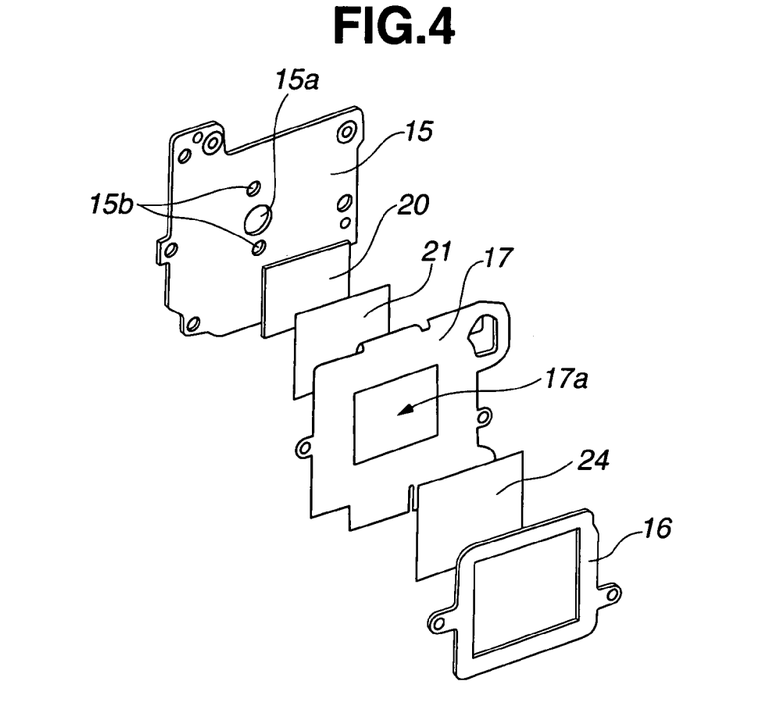
FIG. 4 is an exploded perspective view showing the configuration of the image pickup unit of the embodiment from the front side.
Figure 5:
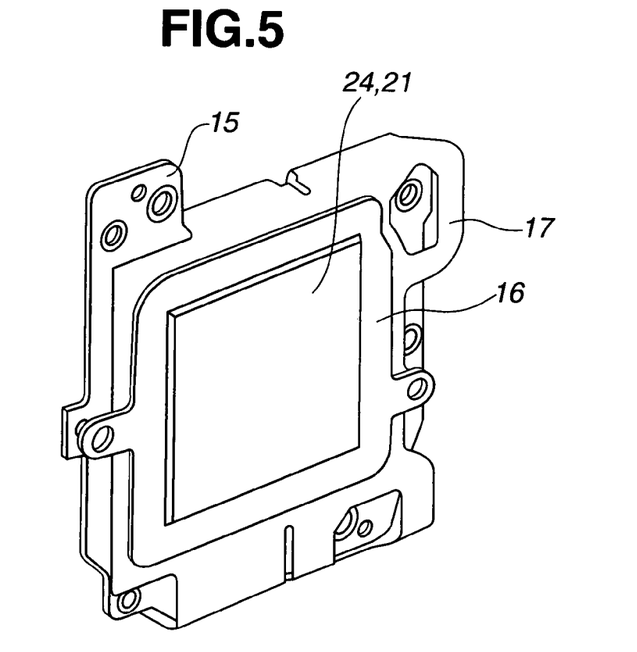
FIG. 5 is a perspective showing an assembled state of the image pickup unit of the embodiment seen from the front side.
Figure 6:
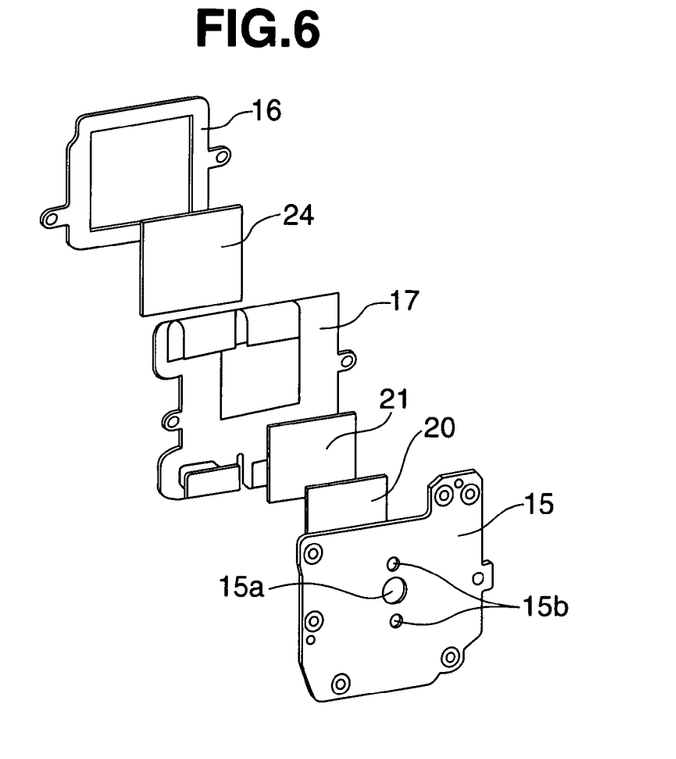
FIG. 6 is an exploded perspective view showing the configuration of the image pickup unit of the embodiment from the back side.
Figure 7:
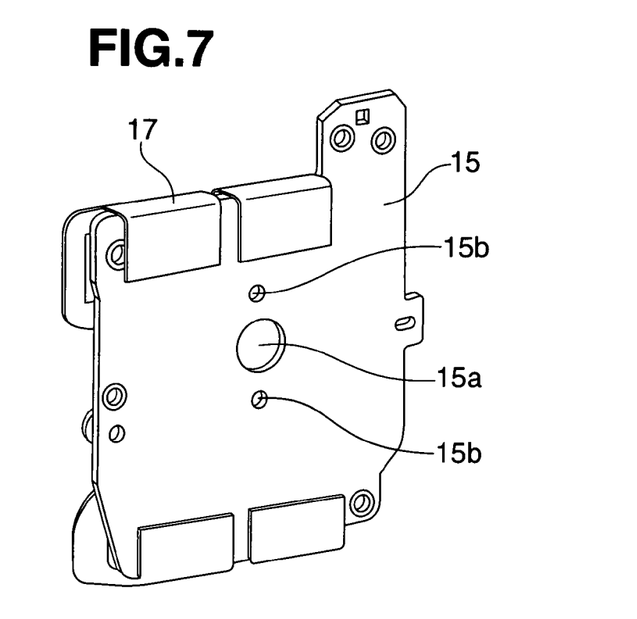
FIG. 7 is exploded perspective view showing the assembled state of the image pickup unit of the embodiment from the back side.
Figure 8:
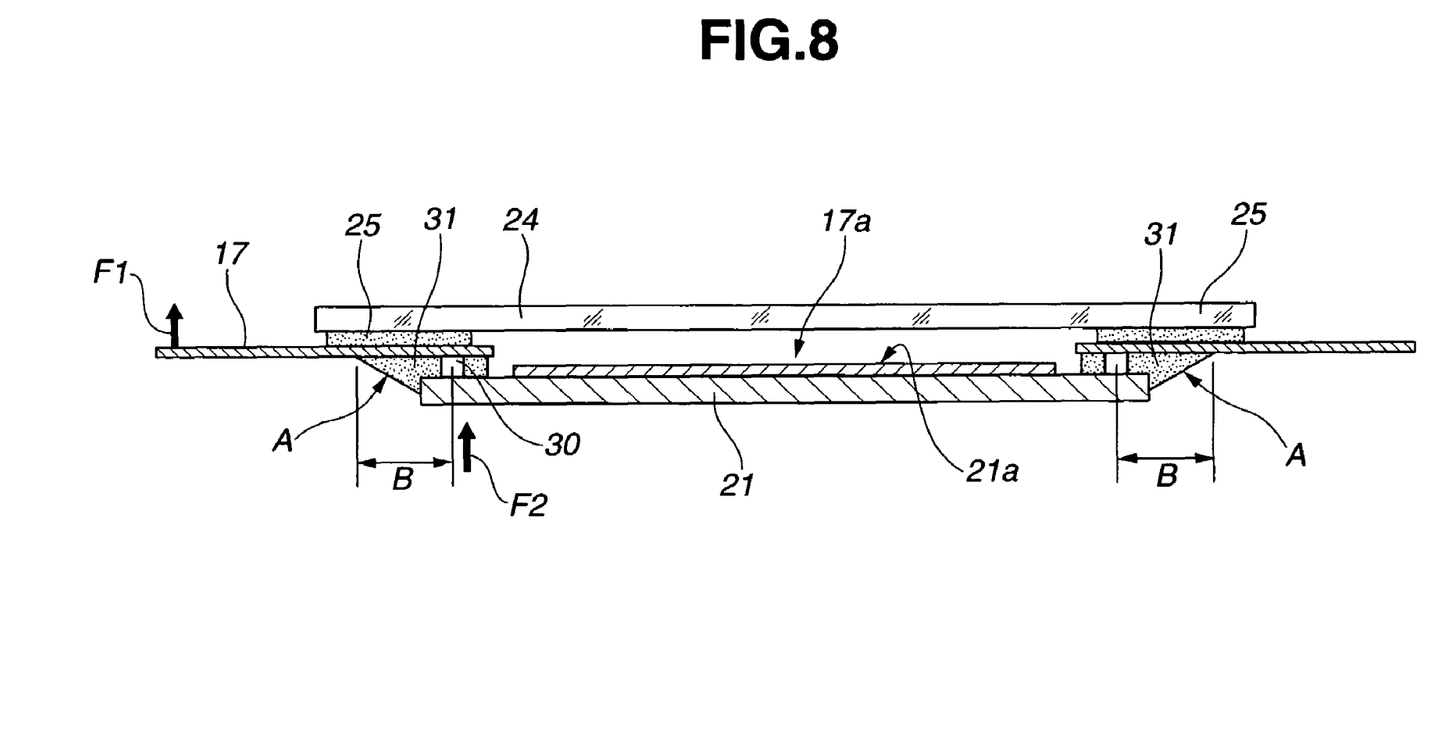
FIG. 8 is a sectional view showing a state where an image pickup device and a protective glass are bonded and fixed to a flexible print circuit board in the image pickup unit of the embodiment.
Figure 9:
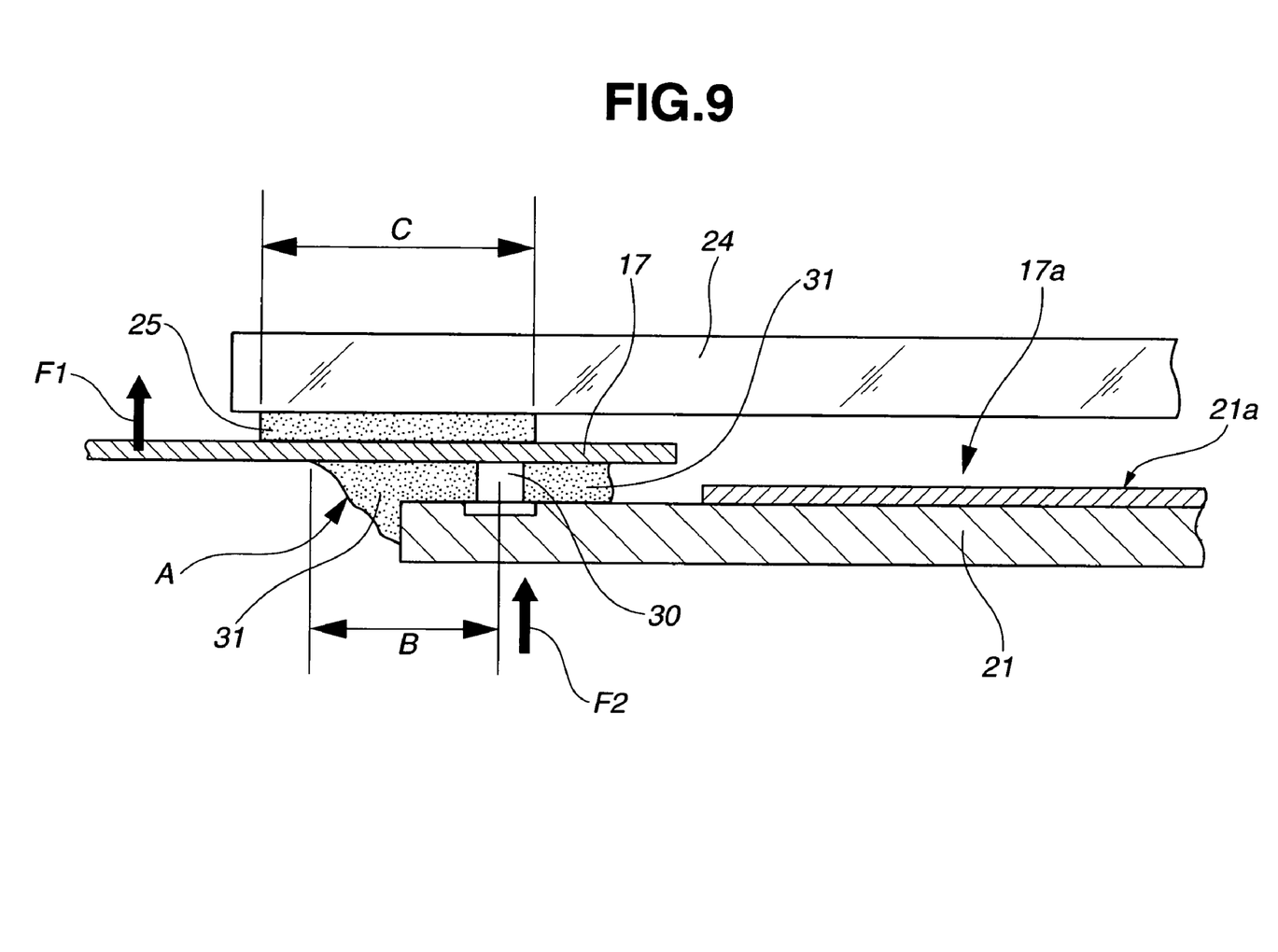
FIG. 9 is an essential part enlarged sectional view showing a part of FIG. 8 in an enlarged manner.

FIGS. 4 and 6 are exploded perspective views showing the configuration of the image pickup unit of the present embodiment. FIG. 4 is a view seen from the front side. FIG. 6 is a view seen from the back side. FIGS. 5 and 7 are perspective views of a state where the image pickup unit of the present embodiment is assembled. FIG. 5 is a view seen from the front side. FIG. 7 is a view seen from the back side. FIG. 8 is a sectional view showing a state where an image pickup device and a protective glass are bonded and fixed to a flexible print circuit board in the image pickup unit of the present embodiment. FIG. 9 is an essential part enlarged sectional view showing a part of FIG. 8 in an enlarged manner.

As shown in FIG. 1, on the front of a body portion 11 of a mirror box 10, a mount mounting surface 13a on which a body mount 13 (not shown in FIG. 1, See FIG. 2) is mounted. The body mount 13 is provided so that a photographing lens barrel (not shown) having a photographing optical system can be detachably attached to the body portion 11. Therefore, an optical axis 0 of the photographing optical system of the lens barrel (See FIG. 2) is so set as to pass the substantially center portion of the body mount 13 and the mount surface of the body mount 13 is so set as to become a surface orthogonal to the optical axis 0 of the photographing optical system when the lens barrel (not shown) is attached to the body mount 13.

In the rear of the body portion 11, an image pickup unit in the image pickup apparatus of the present embodiment which is formed by a fixing member 15, a protective member 16, a flexible print circuit (FPC) board 17 or the like, and includes an image pickup device 21 and the like, which will be described later, is fixed to the body portion 11.

The image pickup unit of the image pickup apparatus of the present embodiment mainly comprises, as shown in FIGS. 2 to 5, the fixing member 15, the protective member 16, the flexible print circuit board 17, a radiating member 20, the image pickup device 21, a protective glass 24 and the like.

The fixing member 15 is a member to be a reference for positioning the image pickup unit with respect to the mirror box 10. The fixing member 15 is formed from a plate-like rigid member, for example, an aluminum material, which is a metal member, a stainless material, ceramic, mold parts and the like.

The protective member 16 is fixed to the flexible print circuit board 17. And the protective member 16 is used for protecting a bonded portion between the image pickup device 21 as well as the protective glass 24 and the flexible print circuit board 17 from a stress caused by bending of the flexible print circuit board 17 and for positioning of the flexible print circuit board 17 with respect to the fixing member 15 when the image pickup unit is assembled.

The image pickup device 21 is a photoelectric conversion device for executing photoelectric conversion processing for generating an image signal according to an optical subject image formed after transmitting through a photographing optical system (not shown). The image pickup device 21 is formed by a bare chip such as a charge coupled device (CCD), for example. On one surface (light receiving surface) of the image pickup device 21, a pixel region 21a (See FIG. 8) is formed. On the same surface as the one on which the pixel region 21a is formed, at a portion adjacent to the pixel region 21a, that is, in the vicinity of an outer circumferential edge portion around the image pickup device 21, a plurality of electrodes 30 are provided. The electrodes 30 are connected to connection patterns (not shown) of the flexible print circuit board 17 with a bump to enable transmitting/receiving of a signal between the flexible print circuit board 17 and the image pickup device 21.

The flexible print circuit board 17 is an electric board provided for supplying an image signal generated through photoelectric conversion processing by the image pickup device 21 to an electric circuit (not shown) such as an image processing circuit or the like. At the substantially center portion of the flexible print circuit board 17, an opening 17a in the substantially rectangular shape (See FIG. 4) is provided. The opening 17a is provided through which a bundle of rays for photographing is passed. Therefore, the opening 17a is larger than the pixel region 21a of the image pickup device 21 and smaller than an outer shape of the image pickup device 21 and is set to be located inner side than the position where the electrode 30 is located. In the vicinity of the edge portion of the opening 17a, the connection pattern (not shown) for connecting to the electrodes 30 of the image pickup device 21 is provided.

The radiating member 20 is provided for radiating heat accumulated in the image pickup device 21. The radiating member 20 is formed by a plate member such as ceramic, for example.

The protective glass 24 has an outer shape larger than that of the image pickup device 21, and serves as a protective cover for protecting an image pickup region of the image pickup device 21 by being provided at a position opposed to the light receiving surface (image pickup region) of the image pickup device 21. The protective glass 24 is formed from a transparent member such as a plate-shaped glass.

The protective glass 24 is fixed to a surface of the flexible print circuit board 17 opposite to the surface on which the image pickup device 21 is fixed by a second adhesive 25 so as to cover the opening the 17a.

As shown in FIG. 2, on the front surface side of the protective glass 24, an optical low pass filter (hereinafter abbreviated as optical LPF) 26 for removing a high-frequency component from a bundle of rays from the subject incident through the photographing optical system (not shown) (hereinafter referred to as a subject bundle of rays) and a shutter 27 for controlling irradiation time and the like of the subject bundle of rays incident toward the light receiving surface of the image pickup device 21 are disposed sequentially.

Arrangement of constituent members of the image pickup unit in the image pickup apparatus of the present embodiment is as follows.

On one surface of the flexible print circuit board 17, that is, on the back surface side, the image pickup device 21 is arranged so as to cover the opening 17a. In this case, the flexible print circuit board 17 and the image pickup device 21 are fixed at least mechanically by a first adhesive 31.

That is, the peripheral edge portion of the opening 17a on the back surface side of the flexible print circuit board 17 and the outer peripheral edge portion on one surface of the image pickup device 21, that is, the same surface side as the light receiving surface (pixel region 21a) are bonded by the first adhesive 31 except the bump portion of the electrode 30 (See FIG. 8).

More particularly, the first adhesive 31 is applied annularly with a first band width between the image pickup device 21 and the flexible print board 17 from the outer edge of the image pickup device 21 to at least an electric connection portion between the connection pattern of the flexible print board 17 and the electrode 30 of the image pickup device 21 and along the peripheral edge of the image pickup device 21. That is, the first adhesive 31 is applied around the opening 17a of the flexible print circuit board 17.

And the first adhesive 31 is applied in a band state along the peripheral edge of the image pickup device 21 so as to cover around the electrode 30, more particularly so as to encircle the connection portion between the connection pattern of the flexible print circuit board 17 and the electrode 30 from an outer edge 21b of the image pickup device 21. By this, the image pickup device 21 is arranged so as to expose the pixel region 21a of the image pickup device 21 from the opening 17a in the fixed state to a predetermined portion on the back surface side of the flexible print circuit board 17.

On the other surface side of the flexible print circuit board 17, that is, the front surface side, the peripheral edge portion of the opening 17a and the outer peripheral edge portion on the back surface side of the protective glass 24 are bonded by the second adhesive 25.

More particularly, the second adhesive 25 is applied annularly with a second band width around the opening 17a of the flexible print circuit board 17. As the second adhesive 25 used at this portion, an ultraviolet hardening type, for example, is applied.

By bonding the protective glass 24 and the flexible print circuit board 17 together, a sealed structure in which a space in the vicinity of the light receiving surface of the image pickup device 21 is sealed against the outside, and the light receiving surface is protected from the outside is formed.

On the other hand, the back surface side of the image pickup device 21, that is, the surface opposite to the light receiving surface of the image pickup device 21, the radiating member 20 is bonded by an adhesive (See FIG. 2).

Moreover, on the back surface side of the radiating member 20, the fixing member 15 is bonded and fixed by an adhesive 32 through a hole 15a drilled in the fixing member 15. Also, holes 15b are used when bonding the radiating member 20 to the fixing member 15. Since details of bonding means of the radiating member 20 to the fixing member 15 is not related to the present invention, the description thereof is omitted.

And the fixing member 15 is fixed at a predetermined portion of the body portion 11 by means such as screwing. Therefore, by this, the image pickup device 21 is fixed to the predetermined portion of the body portion 11 of the mirror box 10.

Next, a bonding portion between the flexible print circuit board 17 and the protective glass 24 as well as the image pickup device 21 will be described below in detail.

As mentioned above, the outer peripheral edge portion on the light receiving surface side of the image pickup device 21 and the peripheral edge portion of the opening 17a on the back surface side of the flexible print circuit board 17 are bonded and fixed by the first adhesive 31 running into the periphery of the electrode 30. As the first adhesive 31, an insulating one is particularly used. And by distributing the first adhesive 31 so as to cover around the electrode 30, the insulation in the vicinity of the electrode 30 is ensured.

In FIGS. 8 and 9, in the adhesion range (application range) by the first adhesive 31 between the image pickup device 21 and the flexible print circuit board 17, a range of a portion shown by reference character A in FIGS. 8 and 9 from the center position of the electrode 30 to the outermost edge of the adhesive 31 attached outside of the outer peripheral of the image pickup device 21 is represented by reference character B. The range indicated by this reference character B is the first band width.

On the other hand, on the front surface side of the flexible print circuit board 17 the peripheral edge portion of the opening 17a and the outer peripheral edge portion on the back surface side of the protective glass 24 are bonded by the second adhesive 25. As the second adhesive 25, the ultraviolet hardening type or the like is applied, for example.

The adhesion range between the flexible print circuit board 17 and the protective glass 24 by the second adhesive 25 (application range of the second adhesive 25), that is, the range from farther outside of the outermost edge of the adhesive 31 to the opening 17a side via the center of the electrode 30 is represented by reference character C as shown in FIG. 9. The range indicated by the reference character C is the second band width.

When the image pickup device 21 and the protective glass 24 are bonded and fixed to the flexible print circuit board 17 by the first adhesive 31 and the second adhesive 25, respectively, in this way, if an external force in an arrow F1 direction in FIG. 9 is applied to bend the flexible print circuit board 17, a stress generated by that becomes a stress to detach the flexible print circuit board 17 at the adhesion portion shown by the reference character A.

In the same state, if a pressing force on the back surface of the image pickup device 21, for example, that is, an external force in an arrow F2 direction in FIG. 9 is applied, the stress generated from that becomes a stress pressing the image pickup device 21 from the back surface and the stress to detach the flexible print circuit board 17 at the adhesion portion shown by the reference character A.

Then, in the image pickup apparatus of the present embodiment, as shown in FIG. 9, the adhesion range C by the second adhesive 25 includes the predetermined application range in the adhesion range by the first adhesive 31, that is, the range B from the center position of the electrode 30 to the portion shown by the reference character A in FIGS. 8 and 9.

That is, when seen from the direction orthogonal to the plane of the opening 17a of the flexible print circuit board 17 (See FIGS. 8 and 9), the second adhesive 25 is applied so that the first band width B by the first adhesive 31 overlaps within the second band width C by the second adhesive 25.

As mentioned above, according to the first embodiment, since the adhesion range C by the second adhesive 25 (second band width) includes the predetermined application range B (first band width) in the adhesion range by the first adhesive 31, a structure having a sufficient strength can be obtained even against the pressing force on the back surface of the image pickup device 21 (external force in the arrow F2 direction in FIG. 9) and the stress to detach the flexible print circuit board 17 at the adhesion portion shown by the reference character A, for example.

Next, an image pickup apparatus of a second embodiment of the present invention will be described below.

Figure 10:
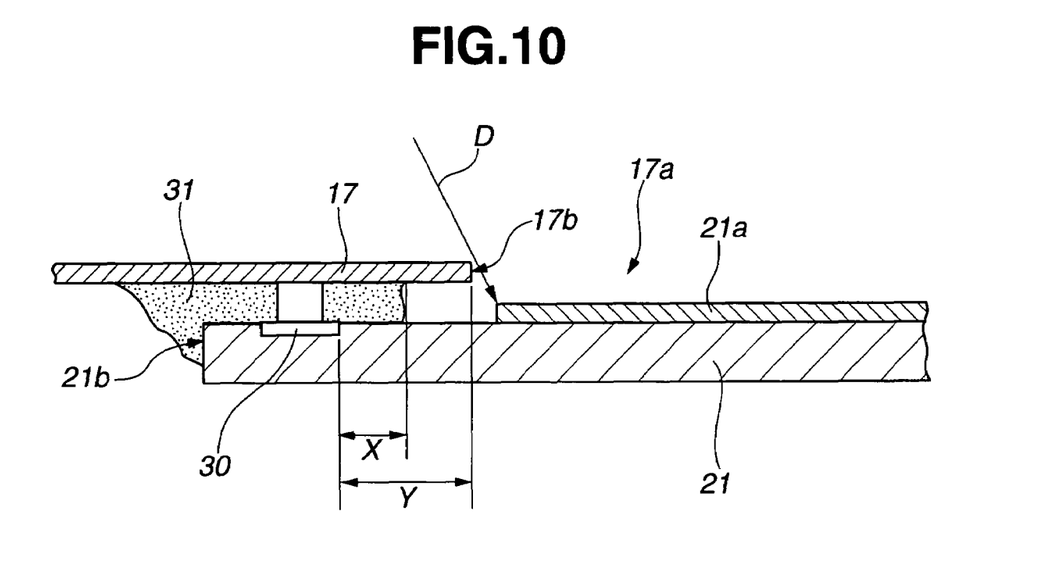
FIG. 10 is an essential part enlarged sectional view showing a state where the image pickup device is bonded and fixed to the flexible print circuit board in an image pickup apparatus according to a second embodiment of the present invention.
Figure 11:
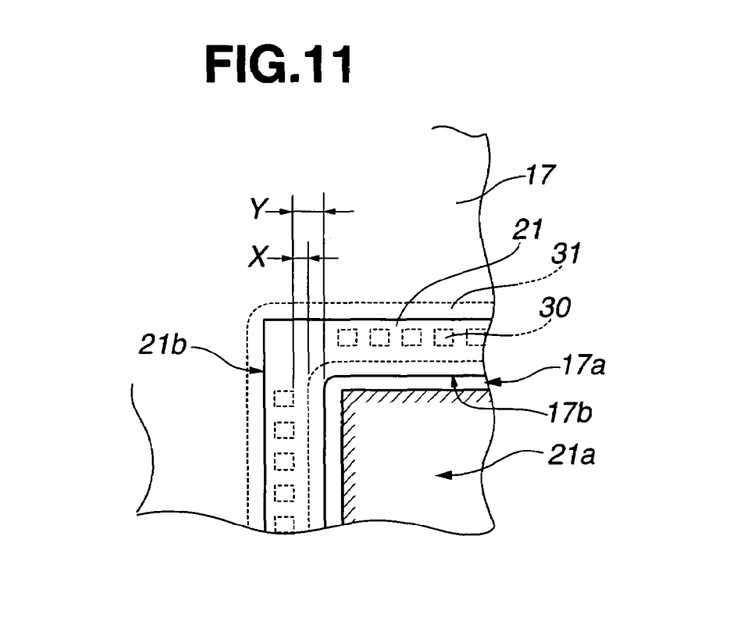
FIG. 11 is an essential part enlarged plan view of FIG. 10 seen from an arrow X direction.

FIG. 10 is a sectional view showing the state where the image pickup device is bonded and fixed to the flexible print circuit board in the image pickup apparatus of the second embodiment of the present invention. FIG. 11 is an essential part enlarged plan view showing a part of FIG. 10 seen from an arrow X direction shown in FIG. 10.

In the above-mentioned first embodiment, by considering resistance of the adhesive detachability between the flexible print circuit board 17 and the protective glass 24 as well as the image pickup device 21 when an external force is applied to the image pickup apparatus as an assembly, and by specifying an adhesion range of the adhesion portion of the protective glass 24 and the image pickup device 21 to be bonded to the flexible print circuit board 17 an image pickup apparatus provided with a sufficient strength and high reliability is realized.

On the other hand, in the present embodiment, by considering the adhesion strength between the flexible print circuit board 17 and the protective glass 24 as well as the image pickup device 21, and by specifying an adhesion range of an adhesion portion of the image pickup device 21 to be bonded to the flexible print circuit board 17, the adhesion range of the adhesive 31 between the both is sufficiently ensured and an image pickup apparatus provided with necessary and sufficient adhesion strength and high reliability is realized.

The image pickup apparatus of the present embodiment has substantially the same configuration as that of the image pickup apparatus of the above first embodiment. Therefore, description will be omitted for the same configuration as that of the above first embodiment and only the difference will be described below in detail.

As described in the above first embodiment, the first adhesive 31 is applied in the band state along the peripheral edge of the image pickup device 21 so as to encircle the electric connection portion between the connection pattern of the flexible print circuit board 17 and the electrode 30 from the outer edge 21b of the image pickup device 21. By this, the image pickup device 21 is arranged so as to expose the pixel region 21a of the image pickup device 21 from the opening 17a in the state where the image pickup device 21 is fixed to the predetermined portion on the back surface side of the flexible print circuit board 17.

The adhesion portion of the flexible print circuit board 17 and the image pickup device 21 of the image pickup unit in the image pickup apparatus of the present embodiment is configured as shown below.

That is, as mentioned above, the outer peripheral edge portion on the light receiving surface side of the image pickup device 21 and the peripheral edge portion of the opening 17a on the back surface side of the flexible print circuit board 17 are bonded and fixed together by the first adhesive 31 running around the electrode 30.

As the first adhesive 31, an insulating one is particularly used. And the first adhesive 31 distributes in the band state along the peripheral edge of the image pickup device 21 so as to encircle the periphery of the electric connection portion between the connection pattern of the flexible print circuit board 17 and the electrode 30 from the outer edge 21b of the image pickup device 21, so that insulation in the vicinity of the electrode 30 is ensured.

Here, in the adhesion range (application range) by the first adhesive 31 between the image pickup device 21 and the flexible print circuit board 17, an adhesion range inside from the end portion of the electrode 30, that is, in the direction toward the peripheral edge portion of the pixel region 21a is represented by reference character X (See FIGS. 10 and 11).

Also, an interval from the end portion of the electrode 30 inward to an inner edge end 17b of the opening 17a of the flexible print circuit board 17 is represented by reference character Y (See FIGS. 10 and 11).

In the image pickup apparatus of the present embodiment, as shown in FIGS. 8 and 9, the inner edge end 17b of the opening 17a of the flexible print circuit board 17 is set at a position separated by 0.3 mm or more from the inner end portion of the electrode 30 toward the peripheral edge portion of the pixel region 21a ($Y \geq 0.3$ mm).

And the adhesion range X in the direction from the end portion of the electrode 30 toward the peripheral edge portion of the pixel region 21a in the adhesion range by the first adhesive 31 is set so as to be contained in a range from the electrode 30 to the inner edge end 17b of the opening 17a of the flexible print circuit board 17, that is, in a range of the above interval dimension Y. That is, the adhesion range A is set smaller than 0.3 mm from the inner end portion of the electrode 30 ($Y \geq 0.3$ mm $> X$).

Also, considering dimensional tolerance of the opening 17a of the flexible print circuit board 17, it is necessary to consider that the opening 17a is small by the tolerance variation. For example, suppose that the dimensional tolerance of the opening 17a is±0.05 mm, the above interval dimension Y is preferably set as follows:

$$Y \geq 0.3 \text{ mm} + 0.05 \text{ mm} \times 2 \geq 0.4 \text{ mm}$$

In other words, the distance from the outer circumference of the pixel region 21a to the end portion of the electrode 30 is 0.4 mm or more.

Considering the incident angle of a light beam D (See FIG. 9) to the pixel region 21a, the above interval dimension should be set so that the peripheral edge portion of the pixel region 21a does not overlap with the inner edge end 17b and the size of the opening 17a is larger than the outer circumference size of the pixel region 21a.

As mentioned above, according to the above second embodiment, since the inner edge end 17b of the opening 17a of the flexible print circuit board 17 is formed at a position separate by 0.3 mm or more or 0.4 mm or more from the end portion of the electrode 30 toward the pixel region 21a, the adhesion range of the first adhesive 31 between the flexible print circuit board 17 and the image pickup device 21 can be secured sufficiently, by which a sufficient adhesion strength is ensured and an image pickup apparatus with reliability can be realized.

In each of the above-mentioned embodiments, as an application example of the protective glass 24, a transparent member or the like such as a plate-shaped glass, is used but not limited to this. As an example of the protective glass 24, a low pass filter, an infrared cut filter or the like may be similarly applied.

Also, in each of the above-mentioned embodiments, the flexible print circuit board 17 is used in the description as an example of an electric board, but not limited to this. As an application example of the electric board, a rigid thin board may be similarly applied, for example.

Moreover, in each of the above-mentioned embodiments, the first adhesive 31 having insularity is used to bond the image pickup device 21 and the flexible print circuit board 17, which is an electric board, but not limited to this. For example, it is needless to say that the image pickup device 21 and the flexible print circuit board 17 may be bonded by using an adhesive including a conductive particle having conductivity by pressing.

In the present invention, it is obvious that different embodiments can be constructed on the basis of this invention in a wide range without departing from the spirit and scope of the invention. The present invention is not restricted by a particular embodiment except as being restricted by appended claims.

What is claimed is:

1. An image pickup apparatus comprising:
    an image pickup device made of a bare chip including a pixel region and an electrode provided on a same surface as the pixel region at a portion adjacent to the pixel region;
    a flexible print circuit board including an opening and a connection pattern arranged in the vicinity of an edge portion of the opening for connecting to the electrode, in which a first adhesive for fixing the flexible print circuit board and the image pickup device together is applied between the image pickup device and the flexible print circuit board from an outer edge of the image pickup device at least to an electric connection portion between the connection pattern and the electrode and applied annularly with a first band width along a peripheral edge of the image pickup device; and
    a protective cover fixed on a surface of the flexible print circuit board opposite to the surface on which the image pickup device is fixed, around the opening annularly with a second band width by a second adhesive so as to cover the opening in order to protect an image pickup region of the image pickup device, wherein the second adhesive is applied around the opening such that the first band width overlaps within the second band width and an outermost peripheral of the second band width is positioned further toward the outside than an outermost peripheral of the first band width when seen from the orthogonal to the opening plane.

2. An image pickup unit comprising:
    an image pickup device made of a bare chip including a pixel region and an electrode provided on a same surface as the pixel region at a portion adjacent to the pixel region;
    a flexible print circuit board having an opening and a connection pattern arranged in the vicinity of an edge portion of the opening for connecting to the electrode, in which a first adhesive for fixing the flexible print circuit board and the image pickup device together is applied between the image pickup device and the flexible print circuit board from an outer edge of the image pickup device at least to an electric connection portion between the connection pattern and the electrode and applied annularly with a first band width along a peripheral edge of the image pickup device; and
    a protective cover fixed on a surface of the flexible print circuit board opposite to the surface on which the image pickup device is fixed, around the opening annularly with a second band width by a second adhesive so as to cover the opening in order to protect an image pickup region of the image pickup device, wherein the second adhesive is applied around the opening such that the first band width overlaps within the second band width and an outermost peripheral of the second band width is positioned further toward the outside than an outermost peripheral of the first band width when seen from the direction orthogonal to the opening plane.

3. The image pickup apparatus according to claim 1, wherein the outer edge of the protective cover extends beyond the outermost peripheral of the second band width.

4. The image pickup unit according to claim 2, wherein the outer edge of the protective cover extends beyond the outermost peripheral of the second band width.

* * * * *